(12) United States Patent
Schafer et al.

(10) Patent No.: US 11,988,595 B2
(45) Date of Patent: May 21, 2024

(54) METHOD AND DEVICE FOR THE DETECTION AND MONITORING OF SURFACE FOULING

(71) Applicant: UNIVERSIDAD DEL PAIS VASCO/EUSKAL HERRIKO UNIBERTSITATEA, Vizcaya (ES)

(72) Inventors: Thomas Schafer, San Sebastian (ES); Iliane Rafaniello, San Sebastian (ES)

(73) Assignee: UNIVERSIDAD DEL PAIS VASCO/EUSKAL HERRIKO UNIBERTSITATEA, Vizcaya (ES)

( * ) Notice: Subject to any disclaimer, the term of this patent is extended or adjusted under 35 U.S.C. 154(b) by 756 days.

(21) Appl. No.: 17/059,915

(22) PCT Filed: May 31, 2019

(86) PCT No.: PCT/EP2019/064190
§ 371 (c)(1),
(2) Date: Nov. 30, 2020

(87) PCT Pub. No.: WO2019/229238
PCT Pub. Date: Dec. 5, 2019

(65) Prior Publication Data
US 2021/0270723 A1  Sep. 2, 2021

(30) Foreign Application Priority Data

May 31, 2018  (EP) ..................................... 18382376

(51) Int. Cl.
*B01D 65/02*    (2006.01)
*B01D 61/14*    (2006.01)
(Continued)

(52) U.S. Cl.
CPC ......... *G01N 17/008* (2013.01); *B01D 61/145* (2013.01); *B01D 65/02* (2013.01);
(Continued)

(58) Field of Classification Search
CPC .... G01N 17/008; B01D 61/145; B01D 65/02; B01D 65/10; B01D 2321/16; C02F 1/008;
(Continued)

(56) References Cited

U.S. PATENT DOCUMENTS 6,878,255 B1 * 4/2005 Wang ................. G01N 27/4473
 204/603
8,970,829 B2    3/2015 Caussin De Schneck et al.
2008/0121027 A1 * 5/2008 Hanson .................... G01N 1/40
 73/61.72

FOREIGN PATENT DOCUMENTS

WO       2017002081 A1    1/2017

OTHER PUBLICATIONS

Gabriela Diaconu; Thomas Schäfer (Study of the interactions of proteins with a solid surface using complementary acoustic and optical techniques) (Year: 2014).*
(Continued)

*Primary Examiner* — Natalie Huls
*Assistant Examiner* — Sharad Timilsina
(74) *Attorney, Agent, or Firm* — LUCAS & MERCANTI, LLP

(57) ABSTRACT

A method for the detection and monitoring of surface fouling from the nanoscale as a predictive or real-time monitoring tool is provided. Also provided are devices for carrying out the method, and to uses of the method, in particular for optimising cleaning procedures of devices or components thereof fouled by flows of foulant.

14 Claims, 8 Drawing Sheets

Figure 1:
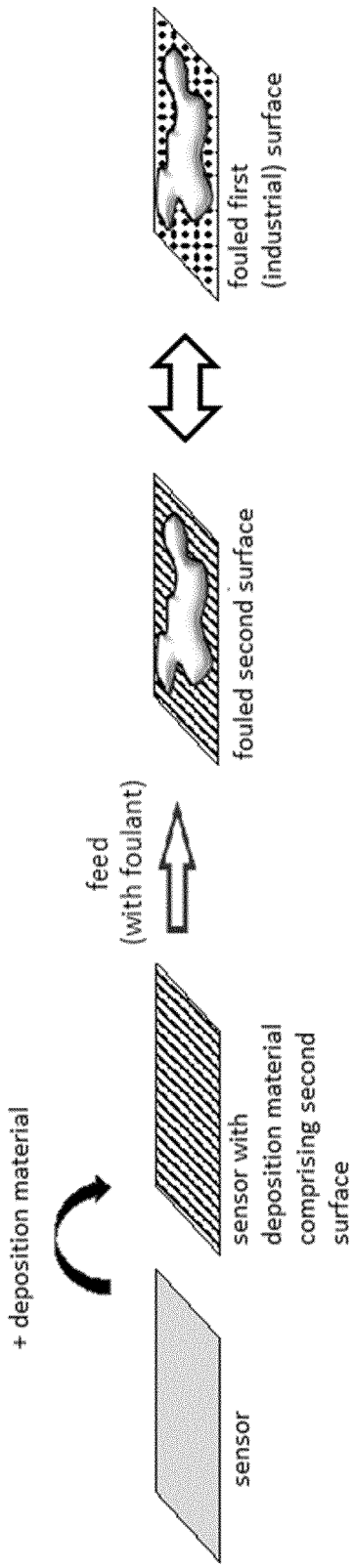

(51) Int. Cl.
 B01D 65/10 (2006.01)
 C02F 1/00 (2023.01)
 C02F 1/44 (2023.01)
 G01N 17/00 (2006.01)
(52) U.S. Cl.
 CPC ............ *B01D 65/109* (2022.08); *C02F 1/008* (2013.01); *C02F 1/444* (2013.01); *B01D 2321/16* (2013.01); *C02F 2303/14* (2013.01); *C02F 2303/16* (2013.01); *C02F 2303/20* (2013.01)
(58) Field of Classification Search
 CPC .. C02F 1/444; C02F 2303/14; C02F 2303/16; C02F 2303/20
 See application file for complete search history.

(56) References Cited

OTHER PUBLICATIONS

Gabriela (Study of the interactions of proteins with a solid surface) (Year: 2014).*
Diaconu, et al., "Study of the Interactions of Proteins With a Solid Surface Using Complementary Acoustic and Optical Technidues", Biointerphases, vol. 9,, No. 2, pp. 029015, 2014.
Huang, et al., "Probing the Interactions of Organic Molecules, Nanomaterials, and Microbes With Solid Surfaces Using Quartz Crystal Microbalances: Methodology, Advantages, and Limitations", Environ. Sci: Processes Impacts, vol. 19, No. 6, pp. 793-811, 2017.
Li, et al., "Direct Observation of Particle Deposition on the Membrane Surface During Crossflow Microfiltration", Journal of Membrane Science, vol. 149, pp. 83-97, 1998.
Hamachi, et al., "Experimental Investigations of Cake Characteristics in Crossflow Microfiltration", Chemical Engineering Science, vol. 54, pp. 4023-4030, 1999.
Coster, et al., "Impedance Spectroscopy of Interfaces, Membranes and Ultrastructures", Bioelectrochemistry Bioenergetics, vol. 40, No. 2, pp. 79-98, 1996.
Chilcott, et al., Electrical Impedance Spectroscopy Characterisation of Conducting Membranes I. Theory, Journal of Membrane Science, vol. 195, pp. 153-167, 2002.
Quillin, et al., "Accurate Calculation of the Density of Proteins", Acta Crystallographica Section D Biological Crystallography, D56, pp. 791-794, 2000.
Altmann, et al., Particle Deposition and Layer Formation at the Crossflow Microfiltration, Journal of Membrane Science, vol. 124, pp. 119-128, 1997.
International Search Report and Written Opinion for Corresponding International Application No. PCT/EP2019/064190 (14 Pages) (dated Aug. 7, 2019).
International Preliminary Report on Patentability for Corresponding International Application No. PCT/EP2019/064190 (28 Pages) (dated Oct. 27, 2020).

* cited by examiner

METHOD AND DEVICE FOR THE DETECTION AND MONITORING OF SURFACE FOULING

CROSS REFERENCE TO RELATED APPLICATION

This Application is a 371 of PCT/EP2019/064190 filed on May 31, 2019 which, in turn, claimed the priority of European Patent Application No. 18382376.4 filed on May 31, 2018, both applications are incorporated herein by reference.

FIELD OF THE ART

The present invention relates to a method for the detection and monitoring of surface fouling, as well as to devices for carrying out said method, and to uses of said method, in particular for optimising cleaning procedures of devices or components thereof fouled by flows of foulant.

STATE OF THE ART

A number of industrial processes exist which as a core element involve the performance of a surface, such as filtrations or heat exchange processes. However, many are the cases wherein said surface becomes fouled during the industrial process by the flow of organic, inorganic or biological matter present in the feed to which the surface is subjected, leading to a reduction in surface performance, and ultimately in the efficiency of the industrial process.

Fouling at a nanoscale is generally not paid much attention to as it apparently does not affect the mentioned industrial processes. Furthermore, it is not trivial to monitor fouling when it first develops in the nanometer range, because there is currently no existing monitoring technique that allows the fouling detection directly in real-time, and in a non-invasive manner at this desired scale.

Direct observation trough membrane (DOTM) uses an optical microscope the objective of which is positioned to observe particle deposition on a surface in real time [H. Li, A. G. Fane, H. G. L. Coster, S. Vigneswaran, J. Membrane Sci. 149 (1998) 83-97]. However, the principal disadvantage of this technique is, firstly, the lack of sensitivity below the wavelength of visible light (400-700 nm); and secondly, the requirement that the surface be completely transparent greatly limits the application of this technique, as most industrial surfaces are not transparent.

Laser triangulometry is used for studying the growth and thickness of fouling layers in the range of microns. However, this technique is unable to detect fouling layers at the nanoscale [Altmann, S. Ripperger, J. Membrane Sci. 124 (1997) 119-128].

Optical laser sensor has also been used for studying fouling formation during microfiltration processes [M. Hamachi, M. Mietton-Peuchot, Chem. Eng. Sci. 54 (1999) 4023-4030]. However, this technique requires a calibration procedure with known values of thicknesses and, again, the equipment is not sensitive enough to provide information about the initially developing layers.

The use of optical coherence tomography (OCT) for monitoring membrane fouling has also been reported in the art [WO 2017002081 A1]. However, yet again, the detection limit of this technique is in the range of 5 microns.

Electrical impedance spectroscopy (EIS) has been widely used for characterizing biological membranes and interfaces [H. G. L. Coster, T. C. Chilcott, A. C. F. Coster, Bioelectrochem. Bioenerg. 40 (2) (1996) 79-98]. Some studies have proposed the use of EIS for characterizing membrane properties and studying membrane fouling [C. Chilcott, M. Chan, L. Gaedt, T. Nantawisarakul, A. G. Fane, H. G. L. Coster, J. Membrane Sci. 195 (2002) 153-167]. However, one of the principal limitations of the method is that the membrane has to be coated with a metal layer, which not only alters the physico-chemical properties of the membrane surface and therefore its interactions with foulants, but also may occlude membrane pores and as a consequence affect the experimental conditions of the filtration process. Additionally, this technique exhibits a low sensitivity for detecting fouling layers in the nanometer range.

The present inventors have now surprisingly found that accurate monitoring of fouling at a small scale, in particular at a nanoscale, can be of unforeseen advantage. For instance, it has been unexpectedly observed that the monitoring of fouling behaviour at a small surface faithfully reproduces the behaviour of fouling at a corresponding larger surface. The monitored small surface can be a small part of the larger (industrial) surface, thus being minimally invasive in the performance of the larger surface; or it can be independent therefrom, thus being non-invasive in the performance of the larger surface. Irrespective of the process conditions in a large scale industrial surface, early-stage physico-chemical interactions between foulants and the surface can be representatively detected on a very small surface sample area.

Furthermore, it has also been unpredictably discovered that handling of fouling at a nanoscale, in particular before any apparent substantial loss in process performance is noted, can have a major impact on the future performance of the industrial process. All of these advantages are realised by the method of the present invention.

BRIEF DESCRIPTION OF THE INVENTION

Thus in a first aspect, the present invention refers to a method for detecting surface fouling comprising:
a) providing a first surface arranged to contact a flow of foulant;
b) providing a sensor system comprising at least one surface sensitive sensor unit, wherein a deposition material is deposited on said surface sensitive sensor unit, wherein the deposition material presents a second surface arranged to contact a flow of foulant;
wherein the second surface presents all physico-chemical properties of the first surface which at said first surface are responsible for foulant accumulation, or rather which at said first surface would be responsible for foulant accumulation should said first surface be subjected to the same flow of foulant to which the second surface is subjected to in step c);
wherein said surface sensitive sensor unit is suitable for generating signals in response to foulant accumulation of from 1 ng/cm$^2$ to 0.1 mg/cm$^2$ at the second surface; and
wherein the sensor system is connected to a data acquisition and monitoring system suitable for monitoring said signals generated by said surface sensitive sensor unit;
c) subjecting the second surface to a flow of foulant; and
d) monitoring said signals generated by said surface sensitive sensor unit, wherein foulant accumulation at the second surface is deemed to be representative of foulant accumulation at the first surface, in particular should said first surface be subjected to the same flow of foulant to which the second surface is subjected to in step c).

In a corresponding different aspect, the invention refers to a device comprising:
 a first surface arranged to contact a flow of foulant;
 a sensor system comprising at least one surface sensitive sensor unit, wherein a deposition material is deposited on said surface sensitive sensor unit, wherein the deposition material presents a second surface arranged to contact a flow of foulant;
 wherein the second surface presents all physico-chemical properties of the first surface which at said first surface are responsible for foulant accumulation;
 wherein said surface sensitive sensor unit is suitable for generating signals in response to foulant accumulation of from 1 ng/cm$^2$ to 0.1 mg/cm$^2$ at the second surface;
 wherein the sensor system is connected to a data acquisition and monitoring system suitable for monitoring said signals generated by said surface sensitive sensor unit.

In another aspect, the present invention is directed to method for detecting and cleaning a fouled surface, comprising the steps of:
 i. detecting surface fouling with a method for detecting surface fouling according to the present invention;
 ii. arresting the flow of foulant after signals in response to foulant accumulation have been generated by the surface sensitive sensor unit;
 iii. then subjecting the second surface, or the first and second surfaces, to a flow of cleaning agent.

FIGURES

FIG. 1: preparation of the second surface and fouling phenomena on the second surface and on the industrial (first) surface.

Figure 2:
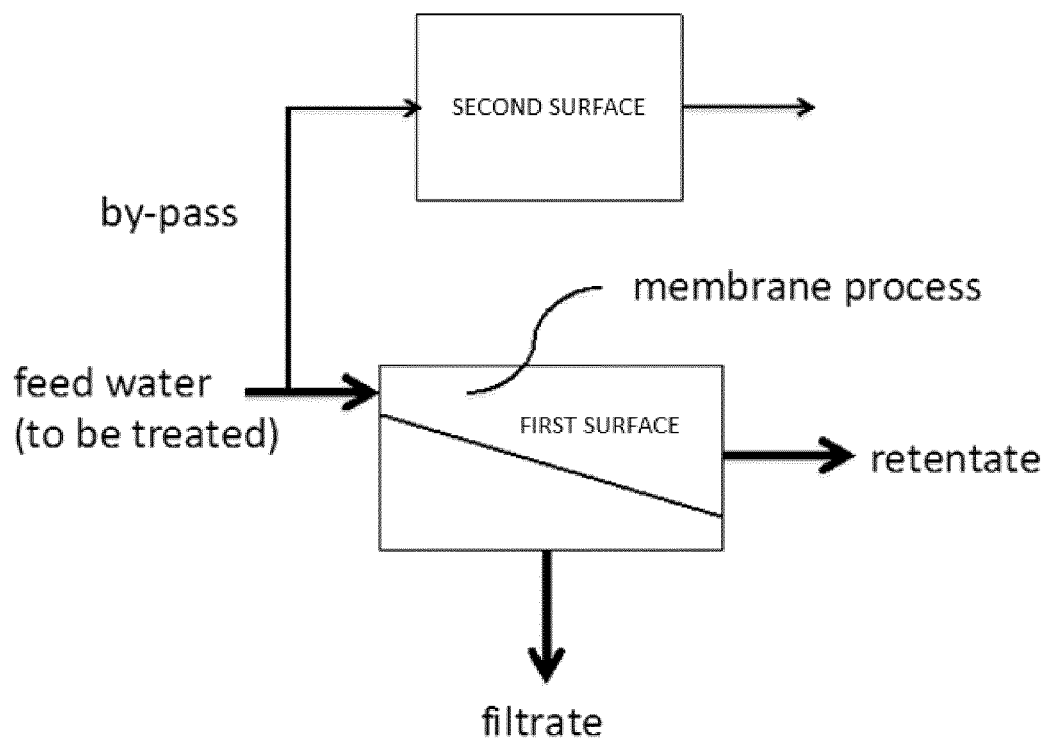

FIG. 2: By-pass configuration in a water membrane filtration process.

Figure 3:
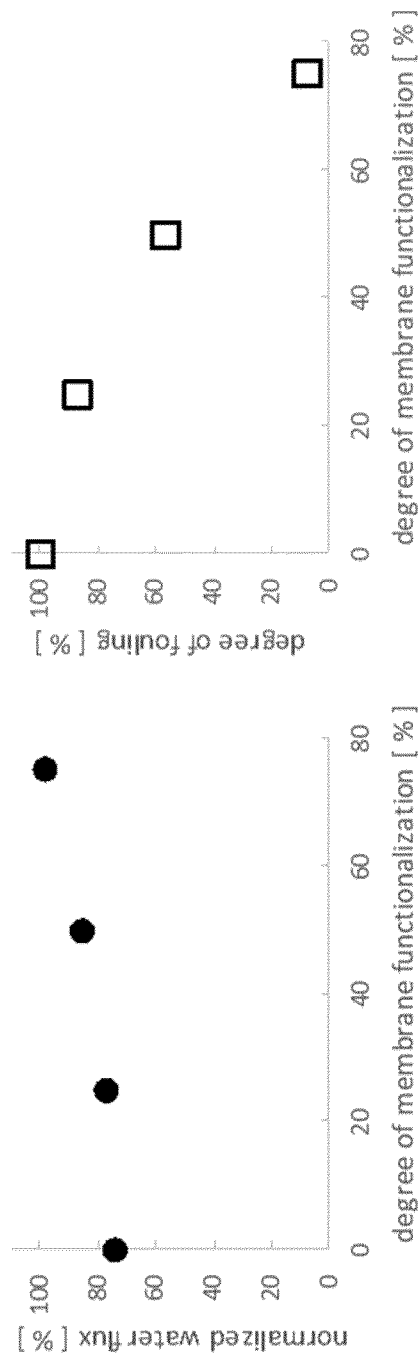

FIG. 3: Water filtration experiment with membranes composed of a polyamide with four different degrees of functionalization. Left: closed circles indicate the normalized water flux (reference: 100% at 75% functionalization). Right: open squares denote the degree of fouling observed under the experimental conditions (100 mg/l BSA in PBS buffer)

Figure 4:
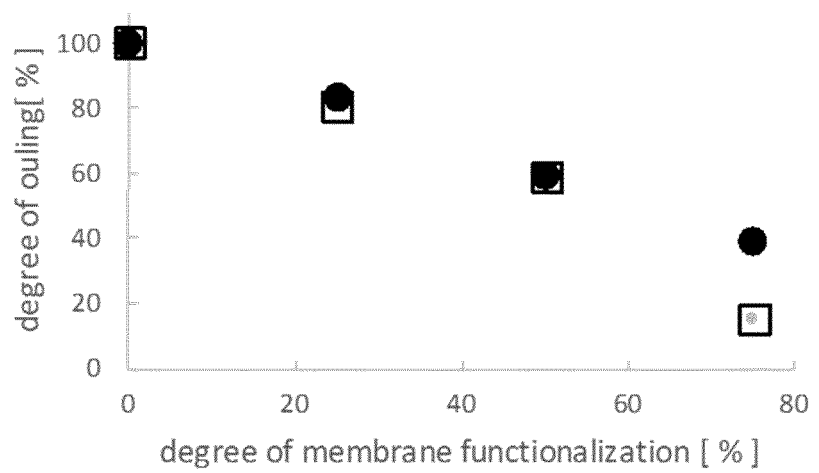

FIG. 4: Degree of fouling measured when the polymer materials of FIG. 3 were deposited on QCM-D (closed circles) and SPR (open squares) sensors. As reference, the maximum fouling observed at zero percent of membrane functionalization was set to 100%.

Figure 5:
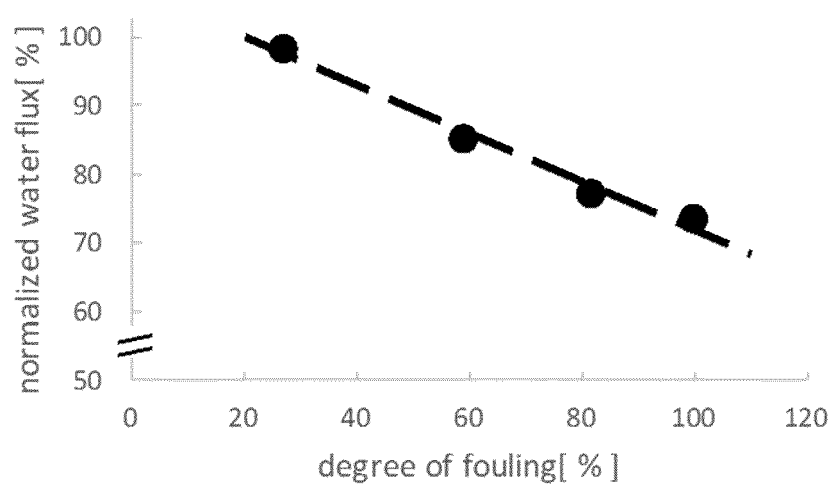

FIG. 5: Correlation between the normalized water flux measured under fouling conditions (100 mg/l BSA in buffer solution, from FIG. 3) and the independently measured data on membrane fouling by the sensor system (from FIG. 4).

Figure 6:
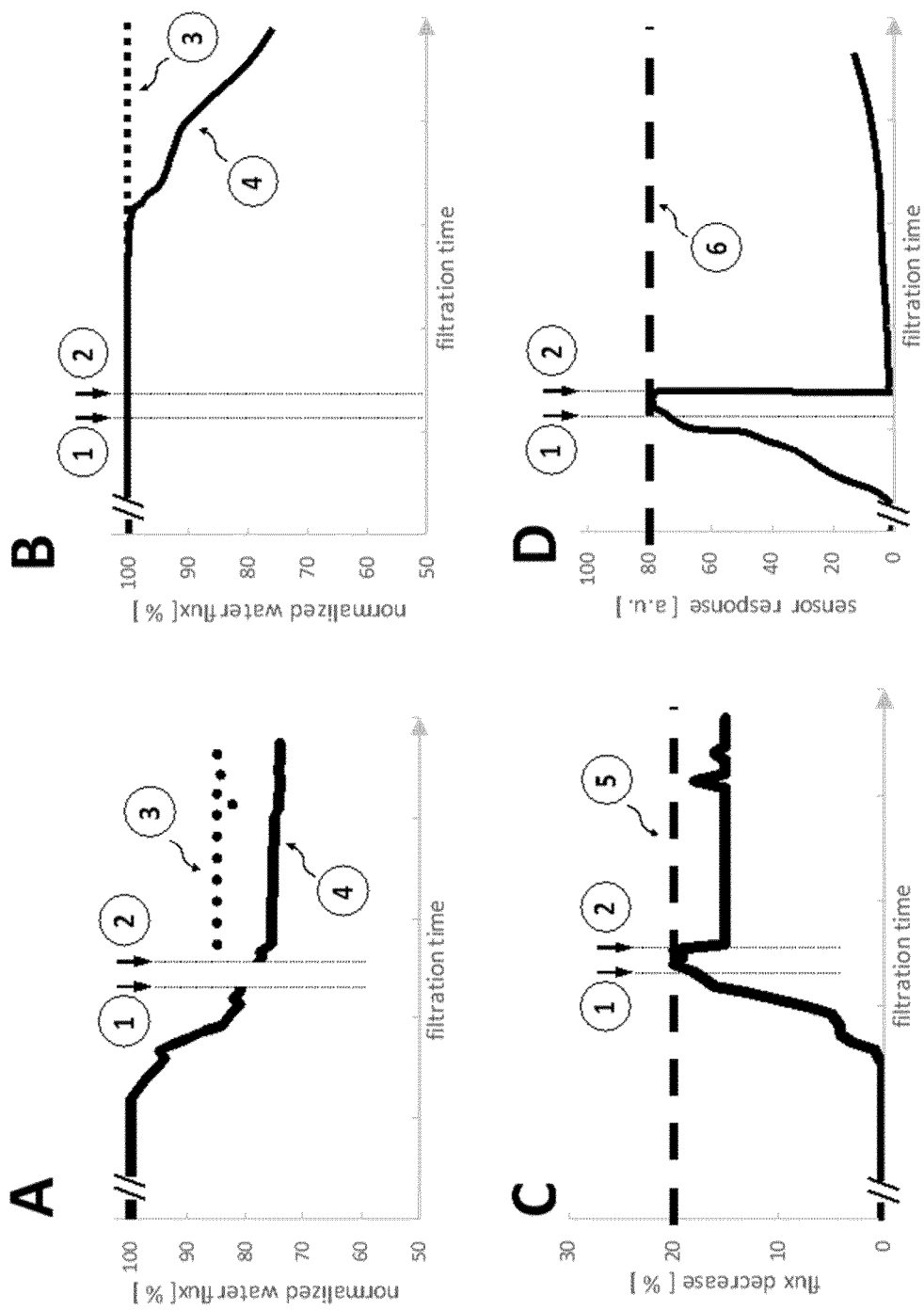

FIG. 6: Comparison of a conventional monitoring of the water flux wherein the feed solution is a model foulant solution (100 mg/l BSA in buffer solution) during a water filtration (FIGS. 6A and C) with the monitoring of the water flux according to the method of the invention (FIGS. 6B and D).

Figure 7:
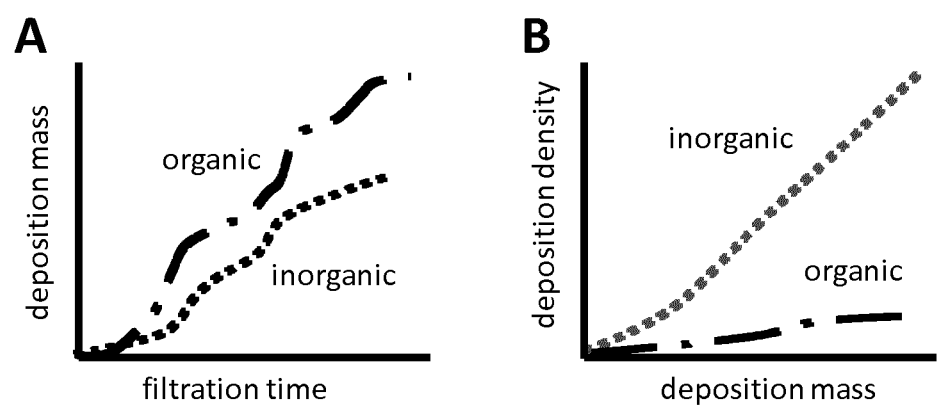

FIG. 7: A: Example for the deposition of matter, organic or inorganic, during a membrane filtration process. B: Detection of inorganic and of organic fouling by the method of the invention.

Figure 8:
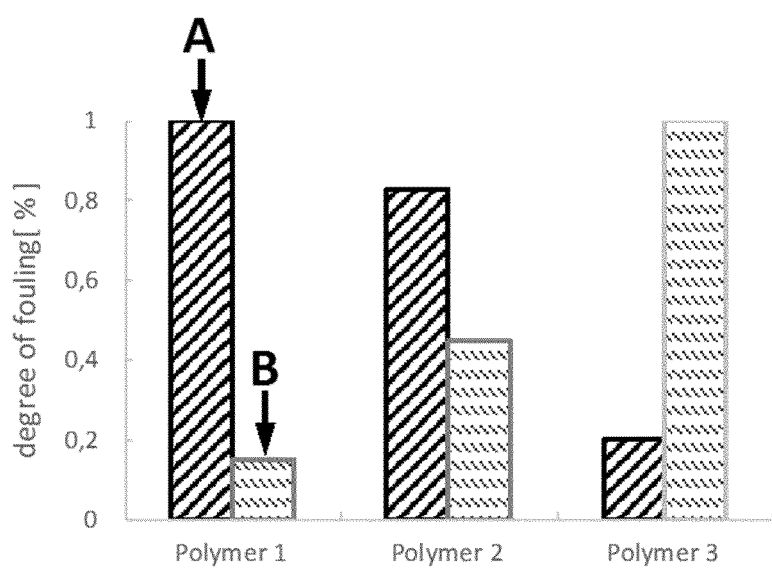

FIG. 8: Example for the deposition of different polymers on the sensors such as to qualitatively distinguish between the physico-chemical nature of the foulants. Solute A preferably interacts with Polymer 1 while solute B preferably interacts with Polymer 3. Both A and B interact with Polymer 2. For example, if A is organic and B is inorganic, these sensor signals indicate whether the cleaning should be optimized for removing organic or for inorganic matter, respectively.

DETAILED DESCRIPTION OF THE INVENTION

In the context of the present invention, the term "fouling" refers to the deposition/accumulation of organic, inorganic or biological matter on a surface which leads to a reduction in performance of the intended surface activity. Said surface activity may be as simple as providing a physical path for a fluid to travel or a physical space for a fluid to be contained, or as complex as filtration or catalytic activity. The surface may be any industrial surface which is fouled when subjected to a flow of foulant. Fouling is a prevalent problem in a good number of industries, e.g. in water treatment processes such as desalination, sewage water purification or water sterilization wherein a filtration membrane is employed; in the production of fuel, such as during the coking process, wherein fouling is a particular problem when employing heating/cooling equipment such as heating or cooling reactors, heat exchangers or distillation equipment; in the production of polymers, where heating or cooling surfaces or catalytic surfaces are typically employed; or in underwater vessels such as ships, wherein marine fouling accumulates at the bottom of the vessel exposed to water.

In the context of the present invention, a sensor unit, or simply a sensor, is a device, module, or subsystem whose purpose it is to detect events or changes in its environment and send/signal the information to other electronics, such as a data acquisition and monitoring system. Sensors typically comprise a sensing surface which is the actual part of the sensor responsible for perceiving said events or changes.

In the context of the present invention, a surface sensitive sensor unit is a sensor whose purpose it is to detect deposition of foulant at the surface of any material deposited on said sensor. In other words, the sensor is covered or coated with a material, and any deposition of foulant on said material is detected by the sensor. In the context of the present invention, the surface sensitive sensor unit is also referred to as the sensor unit, or simply the sensor.

The surface sensitive sensor unit comprises a material deposited thereon, a surface of which (herein referred to also as the second surface) is arranged to contact a flow of foulant. The surface arranged to contact a flow of foulant may be a surface of the deposited material (also referred to herein as deposition material) or a material different to the deposited material. In the latter case, the deposition material is deposited on the sensor, and the surface material is deposited on the deposited deposition material. This latter arrangement can be useful for providing mechanical stability of the surface, or for facilitating deposition of a specific surface on the sensor. However, the deposition material will in most cases be the second surface itself.

In an embodiment, deposition is performed by a deposition technique selected from dip-coating, spraying, spin-coating, chemical vapour deposition (CVD) or atomic layer deposition (ALD).

The thickness of the material deposited on the surface sensitive sensor unit will depend on the specific sensor employed and can for example range from a monolayer thickness to 2000 nm, preferably 900 nm, and more preferably 700 nm. The only factor limiting the thickness of the sensor is the sensitivity of the sensor, as too thick layers of deposition material may cause overloading and malfunction of the sensor.

The present invention allows predicting or reproducing the fouling behaviour at the industrial surface (herein also referred to as the first surface) based on the fouling behaviour at the second surface.

The surface area of the industrial surface can vary greatly depending on the intended use of said surface. The surface area can range from as small as for instance from 10, 100 $nm^2$, 1, 10, 100, 1000 $\mu m^2$, 1, 10 $cm^2$; to as large as any conceivable surface area used in large-scale plants, such as 10, 100, 1000 $m^2$ or even higher. The surface area refers to the surface which is subjected to the flow of foulant.

The surface area of the second surface can be as described above for the industrial surface, however the area need only be as small as to cover the sensor unit, or even only the sensing surface thereof, and can therefore be as small as for instance from 10 $nm^2$ to 10 $cm^2$. The surface area will in each case depend on the specific surface sensitive sensor unit employed. In an embodiment, the surface area of the second surface is from 100 $nm^2$ to 5 $cm^2$, or from 100 $\mu m^2$ to 5 $cm^2$, for instance 1 $cm^2$. In another embodiment, the surface area of the second surface is from 1 $\mu m^2$ to 100 $\mu m^2$. The surface area refers to the surface which is subjected to the flow of foulant. These surface areas also apply to the surface area of the sensor unit or sensing surface thereof on which the deposition material is deposited.

The small space occupied by the sensor unit(s) and the surface of the second surface covering said sensor unit(s) implies that the method of the invention can be carried out with reduced-sized devices, equipment or kits. Said reduced size, combined with the fact that the sensor unit comprising the second surface need not be an integral part of the industrial surface, implies that said devices, equipment or kits are optimal for portable use.

The surface area of the industrial surface will typically exceed the area of the second surface. In a preferred embodiment, the surface area of the second surface is smaller than the surface area of the industrial surface.

In an embodiment, the surface area of the second surface represents between 0.01 and 90%, preferably between 0.01 and 50%, more preferably between 0.01% and 10%, even more preferably between 0.01% and 1% of the surface area of the first surface. When the first and second surfaces form a single surface, the smaller the percentage, the less invasive the present invention is on the performance of the single surface. When multiple surface sensitive sensors are employed, these percentages apply to the sum of the surface areas of the second surfaces of each of said sensor units.

In an embodiment, the second surface is an integral part of the actual industrial surface. In this embodiment, the first surface and the second surface form a continuum, i.e. a single surface.

In an especially preferred embodiment of the present invention, the second surface is not an integral part of the industrial surface, i.e. it is independent therefrom. Thus, the first surface and the second surface do not form a continuum, i.e. a single surface. This embodiment allows dissociating the sensor unit and material deposited thereon from the industrial surface, which provides a number of advantages. This is generally depicted in FIG. 1.

In particular, it has surprisingly been found that the fouling behaviour observed at the second surface can still faithfully reproduce or predict the behaviour observed at the industrial surface. This enables monitoring the fouling process at the industrial surface in a non-invasive manner. Furthermore, the first and second surface (the latter deposited on the sensor unit/system) need not be part of the same site (device, system, setup, process, or production plant). Thus, in an embodiment, the first and second surface are part of the same site, and in a different embodiment, the first and second surface are not part of the same site. The latter allows for instance running fouling tests at sites distant from the actual site wherein the industrial surface is contained and run or intended to be run.

Fouling at the second surface can be detected and monitored either before the industrial surface is subjected to the same flow of foulant as the second surface, or at the same time. Ideally, all subjecting conditions are identical at the second and first surface in order to ensure accurately reflecting the fouling phenomenon, but any such condition may be varied if desired. By referring to the level of fouling (i.e. deposition/accumulation of foulant) detected when all said conditions are identical, specific conditions may be varied and the level of fouling detected compared to the level of fouling detected when all said conditions are identical in order to establish whether a specific condition alters the fouling process or not. This allows identifying and employing, at the second surface, conditions which may be different and more advantageous (e.g. from an economic or process simplicity point of view) but which nevertheless perform in the same manner in terms of the level of fouling detected, or even in a different manner, compared to the conditions at the industrial surface. Preferably, the conditions employed at the second surface alter the level of fouling no more than 10%, preferably 5%, more preferably 1% with respect to the level of fouling detected when all conditions are identical, however more preferably, the conditions employed at the second surface are different but do not alter the level of fouling with respect to the level of fouling detected when all conditions are identical. Conversely, the conditions employed at the industrial surface lead to a level of fouling which is altered in no more than 10%, preferably 5%, more preferably 1% with respect to the level of fouling detected at the second surface, however more preferably, the conditions employed at the industrial surface are different but do not alter the level of fouling with respect to the level of fouling detected when all conditions are identical. The term "conditions" refers to all conditions mentioned hereinafter, such as foulant concentration, foulant flow, the foulant compound, material of which the surface is made, temperature, and any other condition involved in the fouling process.

It has however surprisingly been observed that conditions such as the bulk hydrodynamic flow conditions over the surface or the surface topography can be different at the first and second surface without affecting the level of fouling detected.

In a preferred embodiment, the concentration of foulant to which the first and second surface is subjected is the same. In a preferred embodiment, the concentration of foulant to which the first and second surface has been subjected at the end of the subjecting is the same, and the time of subjecting of foulant to the first and second surface is preferably the same.

In an embodiment, the temperature of the surface and/or of the flow of foulant during subjecting to a flow of foulant is the same at the first and second surfaces.

In an embodiment, the subjecting of a surface to a flow of foulant is by flowing the flow of foulant past the surface in a manner enabling contact between foulant compound and the surface. In a more particular embodiment, the speed at which the flow of foulant passes past the first and second surfaces is the same.

The above conditions can be controlled by means known to the skilled person. For example, temperature can be controlled through the use of a chamber such as a microfluidic chamber. The speed of flow of foulant can be controlled for instance with the use of pumps.

The actual foulant (compound) to which the second surface is subjected is preferably the same foulant as that to which the first surface is subjected. However, it is also within the scope of the invention to employ different structure yet equally or similarly fouling foulants. Preferably, the foulants employed at the second and the industrial surface share physico-chemical properties which are responsible for their deposition on the surface (i.e. for their fouling nature), such as specific functional group reactivities, steric, or electronic properties (e.g. charge, polarity, hydrophobicity or -philicity). More preferably, the foulants employed at the second and the industrial surface share all physico-chemical properties which are responsible for their deposition on the surface.

Preferably, the material of which the first and second surface are made is the same, however, the material of which one surface is made can be a material different to that of which the other surface is made but the surfaces share physico-chemical properties which are responsible for the deposition or accumulation of foulant on their surface. Preferably, all said physico-chemical properties are shared.

There are no specific physico-chemical properties responsible for surface foulant accumulation which can be universally applied to any imaginable surface subjected to fouling. The skilled person knows, or knows how to determine, on a case to case basis, which physico-chemical properties are responsible for surface foulant accumulation. Examples of said properties are functional group reactivities, steric, or electronic properties (e.g. charge, polarity, hydrophobicity or -philicity), and in the particular case of filtration membranes also pore size or pore size distribution.

Detecting and monitoring fouling at the second surface before the industrial process is actually run can be advantageous as a predictive tool. Here, foulant accumulation at the second surface is deemed to be representative of foulant accumulation that would be detected at the first surface when subjected to a flow of foulant under corresponding conditions.

This embodiment is particularly advantageous in cases where a high level of fouling is detected and thus predicted for the industrial surface, which makes the running of the industrial process involving subjecting of the first surface to a flow of foulant under corresponding conditions undesired, in which case the running of the process at the industrial surface can be discarded without incurring in the cost of running it.

Detecting and monitoring fouling at the second surface can however be performed in parallel to running the industrial process. This implies subjecting the first and second surfaces to the same flow of foulant in parallel, meaning that the subjecting of the first surface coincides in time with the subjecting of the second surface. Preferably, the subjecting of the second surface begins before the subjecting of the first surface, or more preferably at the same time (i.e. simultaneously), and is preferably maintained in time for the same length of time. The simultaneous subjecting of the surfaces to the flow of foulant is advantageous in that it allows real-time monitoring of the first surface via the monitoring of the second surface.

In the context of the present invention, whenever more than one surface, such as the first and second surface, is subjected to a same flow of foulant, it is implied that the same flow of foulant does not pass through one surface and then the other, but rather that each surface is subjected to an independent flow of foulant.

In a preferred embodiment, the parallel or simultaneous subjecting of the first and second surface to the flow of foulant is achieved by providing a flow of foulant which is split upstream from the first and second surfaces into at least two separate sub-flows of foulant, and by subjecting the first surface to one of said sub-flows of foulant, and subjecting the second surface to the other of said sub-flows of foulant (by-pass configuration). This arrangement as applied to a water filtration process is depicted in FIG. 2.

In the context of the present invention, fouling (also referred to herein as level of fouling, or foulant accumulation) can be expressed as the amount of foulant deposited on a surface per area of the surface. The term "deposited" means that the foulant remains at the surface and does not leave the surface with the flow of foulant from which it stemmed. Said deposition can occur through different kinds of chemical interaction between the surface and the foulant, such as weak van der Waals interactions, or stronger interactions such as electrostatic, covalent or H-bond interactions, or even simply. The morphology of the surface may also provide for physical deposition, where the foulant is trapped and retained by the surface morphology and cannot escape the surface with the outgoing flow of foulant; this can occur for instance in the context of surface which possess pores, wherein foulant can deposit simply due to gravity.

For instance, in the context of filtration membranes, IUPAC defines fouling as a "process resulting in loss of performance of a membrane due to the deposition of suspended or dissolved substances on its external surfaces, at its pore openings, or within its pores" (IUPAC, A. D. McNaught and A. Wilkinson, Compendium of Chemical Terminology, 2nd ed., Blackwell Scientific Publications, Oxford, 1997).

As a surface is subjected to a flow of foulant, foulant molecules are deposited e.g. by reaction with, or adhesion or absorption to, the surface, where they accumulate. These accumulated foulant molecules then interfere with the normal functioning of the surface for its intended purpose. Said foulant molecules are detected through the surface sensitive sensor unit used in the method of the present invention.

Such a sensor is a sensor suitable for or is used for detecting levels of foulant deposited/accumulated at the surface of from 1 $ng/cm^2$ to 0.1 $mg/cm^2$, as this has surprisingly been found to accurately and rapidly reproduce the fouling behavior at greater scales and to enable cleaning of surfaces before irreversible damage by the foulant is caused. In an embodiment, the sensor is a sensor suitable for or is used for detecting levels of foulant deposited/accumulated at the surface of from 1 $ng/cm^2$ to 0.1 $mg/cm^2$, preferably of from 10 $ng/cm^2$ to 0.1 $mg/cm^2$, more preferably of from 100 $ng/cm^2$ to 0.1 $mg/cm^2$. In another embodiment, the sensor is a sensor suitable for or is used for detecting levels of foulant deposited/accumulated at the surface of from 1 $ng/cm^2$ to 0.01 $mg/cm^2$, preferably of from 10 $ng/cm^2$ to 0.01 $mg/cm^2$, more preferably of from 100 $ng/cm^2$ to 0.01 $mg/cm^2$. In another embodiment, the sensor is a sensor suitable for or is used for detecting levels of foulant deposited/accumulated at the surface of from 1 $ng/cm^2$ to 0.001 $mg/cm^2$, preferably of from 10 $ng/cm^2$ to 0.001 $mg/cm^2$, more preferably of from 100 $ng/cm^2$ to 0.001 $mg/cm^2$.

It is to be understood that these sensors may be additionally capable of detecting higher amounts of foulant, however the present invention lies principally in the detection of foulant at the above mentioned ranges.

Alternatively, foulant deposition is detected through a surface sensitive sensor unit suitable for or is used for detecting the thickness of the mass (e.g. layer) of the foulant deposited on the surface. In particular, the surface sensitive sensor unit is suitable for or is used for detecting the thickness of mass of foulant deposited on the surface, wherein the thickness is from 1 nm to 10000 nm, preferably from 1 nm to 1000 nm, more preferably from 1 nm to 100 nm, even more preferably from 1 nm to 10 nm; or in another embodiment from 10 nm to 10000 nm, preferably from 10 nm to 1000 nm, more preferably from 10 nm to 100 nm; or in another embodiment from 100 nm to 10000 nm, preferably from 100 nm to 1000 nm. The thickness preferably refers to the length perpendicular to the surface.

In a particularly preferred embodiment, the foulant deposition is detected through a surface sensitive sensor unit which is suitable for detecting both the levels of foulant deposited at the surface as described above, as well as the thickness of the mass of said foulant deposited at the surface as described above. Thus, all the different ranges specified in the above corresponding paragraphs can be combined without limitation to generate all possible combinations each in further particular embodiments.

Examples of surface sensitive sensor units that may be used in the context of the present invention are acoustic wave sensors, such as bulk acoustic wave (BAW) devices which can comprise, but are not limited to, the thickness shear mode (TSM) resonator or the shear-horizontal acoustic plate mode (SH-APM) sensor, or surface acoustic wave (SAW) devices which can comprise, but are not limited to, the shear-horizontal surface acoustic wave (SH-SAW) sensor or surface transverse wave (STW) sensor. Of particular interest are sensors that permit measuring both the deposition of matter on the sensor surface and the viscoelastic properties or changes of this matter under operating conditions. Other possible acoustic sensor types are those based on the flexural plate wave (FPW), Love wave, surface-skimming bulk wave (SSBW), or Lamb wave;

sensors based on plasmon resonance, such as a multi-parameter surface plasmon resonance (MP-SPR) sensor or sensors based on localized surface plasmon resonance phenomena;

waveguide sensors;

sensors based on field-effect transistors, such as chemical field-effect transistors (ChemFET) or ion-sensitive field-effect transistors (ISFET);

Chemiresistive sensors.

In a preferred embodiment, the surface sensitive sensor unit is suitable for sensing or is used to sense foulant accumulation without involving the flow of foulant in the measurement/sensing. In other words, the flow of foulant does not interfere in the sensing of the foulant deposited on the surface performed by the sensor. Said interference typically occurs with optical sensors in which light emitted by a source of light must travel through the flow of foulant before the light is sensed by the sensor. The sensor is preferably a surface sensitive sensor unit suitable for sensing or is used to sense foulant accumulation without involving measuring the optical transparency of the flow of foulant, and/or without involving measuring scattering of light emitted into said flow of foulant. For instance, ellipsometry and interferometry sensors are examples of optical sensors in which the flow of foulant interferes in the sensing.

The surface sensitive sensor unit perceives (i.e. detects) the accumulation/deposition of foulant when a physical parameter generated by the sensor or by a source independent from the sensor is altered in response to foulant accumulation at the surface. The physical parameter varies depending on the kind of sensor employed.

In a preferred embodiment, the surface sensitive sensor unit is an acoustic sensor unit. An acoustic sensor is a sensor which transduces an input electrical signal into a mechanical wave which is altered by the deposition of foulant on the surface of the deposition material deposited on the sensor. Alterations include alterations in amplitude, phase, frequency, or time-delay of the wave. The sensor then transduces said altered wave back into an electrical signal, which can be monitored by a data acquisition and monitoring system. The amount of alteration is taken to be proportional to the amount of foulant deposited on the surface.

Types of acoustic sensors are surface acoustic wave sensors and film bulk acoustic resonators. Examples of specific acoustic sensors are Shear Horizontal Surface Acoustic Wave (SH-SAW), Surface Transverse Wave (STW), Love Wave (LW), Shear Horizontal Acoustic Plate Mode (SH-APM) and Layered Guided Acoustic Plate Mode (LG-APM) sensors.

In a preferred embodiment, the acoustic sensor is a quartz crystal microbalance (QCM), and in particular a quartz crystal microbalance with dissipation monitoring (QCM-D). In the case of the QCM, the sensor is excited to oscillate at a resonance frequency by the application of an alternating voltage, and said frequency depends on the total oscillating mass of the sensor, which includes the deposited foulant when said foulant has deposited on the sensor. The sensor signals a change in frequency that is proportional to the change in said mass. For rigid films, the frequency can be correlated to the deposited mass per area of sensor surface by the so-called Sauerbrey equation:

$$m_{adsorbed}\left[\frac{\text{ng}}{\text{cm}^2}\right] = 17.8\left[\frac{\text{ng}}{\text{Hz} \cdot \text{cm}^2}\right] \cdot F[\text{Hz}]$$

wherein:

$m_{adsorbed}$ refers to mass adsorbed on the sensor surface; and

F refers to the measured frequency of the QCM.

Hence, any deposition will be measured as a frequency change F and can be correlated to an adsorbed mass $m_{adsorbed}$.

If the QCM is operated in the so-called "ring-down mode", then the energy dissipation of the sensor can be measured ("quartz crystal microbalance with dissipation monitoring", "QCM-D"). The energy dissipation can, in turn, be correlated with the viscoelastic properties of the foulant layer such that the sensor is not only a mass detector.

In another preferred embodiment, the sensor is an optical sensor. An optical sensor is a sensor that converts light into an electronic signal. The optical sensor generally includes a source of light, which may be part of the sensor or independent therefrom. Alterations in properties of the light emitted by the source of light, such as the quantity of light, can take place upon deposition of foulant on the surface of the material deposited on the sensor, and are sensed by the sensor. The sensor then transduces said altered light into an electrical signal, which can be monitored by a data acquisition and monitoring system. The amount of alteration is taken to be proportional to the amount of foulant deposited on the surface. In a preferred embodiment, the optical sensor is a surface plasmon resonance sensor, more particularly an MP-SPR. In surface plasmon resonance, an incident beam of p-polarized light strikes on the deposition material (at a surface opposite to the surface subjected to the flow of foulant), and the light is reflected at a given angle. A large angular range is scanned, and when the incident light excites surface plasmons this results in a reduced intensity of the reflected light. Said intensity is altered upon deposition of foulant at the surface subjected to the flow of foulant and the alteration is signaled by the sensor.

In a preferred embodiment, the sensor system comprises more than one surface sensitive sensor unit, which are preferably of different types, i.e. which preferably each detect a different physical parameter influenced by the deposition of foulant. This improves the reliability of the detection of the fouling process and strongly reduces the risk of experimental artefacts in the detection. In preferred embodiment, the sensor systems comprises at least one optical sensor as described above, and at least one acoustic sensor as described above. For example, so-called "bound water" in hydrophilic layers contributes to the measurement signal (mass effect) of the piezoelectric QCM-D but is invisible to MP-SPR since such water is of the same refractive index as the bulk water in the liquid boundary layer.

Additionally, the sensor system may comprise a sensor employed as a control. The control sensor is provided in a setup identical to that of the sensor-deposition material-second surface of the invention, but is independent therefrom. The second surface of the material deposited on the control sensor is subjected to a flow of foulant under identical conditions to those at the second surface of the non-control sensor, but the flow of foulant comprises no foulant. In this way, noise which might be altering the detection or reading of fouling level at the non-control sensor can be identified and if necessary taken into account when determining the fouling level detected by the non-control sensor.

Signals generated by the sensors in response to foulant accumulation are received and monitored by a data acquisition and monitoring system suitable for such purpose to which the sensor is connected. The data acquisition and monitoring system receives the signal from the sensor and converts it into data, which is then displayed in a format which can be read by the user. The data acquisition and monitoring system is for instance a computation device, which preferably comprises:

means for converting sensor signals into data; for instance, where the sensor generates an analogue signal, the data acquisition system may convert it into a digital signal; and means for displaying the data;

preferably means for storing and retrieving said data, and preferably a data interface allowing managing of said the data.

These can be achieved through the use of a dedicated software or of commercially available solutions, e.g. solutions offered by National Instruments ("Labview") or Mathworks ("Matlab"). The data acquisition and monitoring system may also account for sensor signals not specific to foulant accumulation, e.g. generated from changes in the bulk composition of the flow of foulant, which will be compensated for by through signals received from a control sensor that does not have any foulant deposited thereon.

In the context of the present invention, the expression "flow of foulant" refers to the form in which the foulant is employed. This may be a fluid, i.e. a gas or a liquid carrying the foulant, for instance it may be a solution or a dispersion (e.g. suspension or emulsion) of the foulant. In a preferred embodiment, the solution or dispersion is an aqueous solution or suspension such as sewage or saline water, or water comprising proteins.

The subjecting of the surfaces to the flow of foulant refers to the exposure of a surface to the foulant in a manner in which foulant accumulation in the flow of foulant at the surfaces can take place, i.e. in a manner allowing contact between surface and foulant.

The surfaces are preferably subjected to a flow of foulant in the form of a stream which contacts the surface as is flows past it.

In an embodiment, the first surface does not comprise, in particular is not deposited on, a sensor system, in particular such as that described herein.

The present invention is also based on the surprising finding that the early detection and elimination of surface fouling at a nanoscale has a crucial impact on the future performance of the surface. In particular, it has been observed that allowing accumulation of foulant beyond the nanoscale can lead to fouling which causes irreversible loss of performance of the surface.

Thus, in an aspect, the present invention refers to a method for detecting and cleaning a fouled surface, comprising the steps of:
i. detecting surface fouling of the surface with a method as described in any embodiment of the invention disclosed herein;
ii. arresting the flow of foulant after foulant accumulation is detected by the surface sensitive sensor unit;
iii. then subjecting the surface or surfaces which were subjected to fouling, to a flow of cleaning agent.

In an embodiment, the arresting of the flow of foulant is carried out when a pre-determined level of fouling has been reached. This pre-determined level of fouling can be a level of fouling beyond which it has been determined the fouling causes an irreversible reduction in surface performance as determined after elimination of the accumulated foulant or after cleaning with a specific cleaning agent. Said level of fouling can be determined by repeatedly carrying out the fouling process and arresting the flow of foulant at different times, after which the foulant is cleaned and surface performance is measured.

In a preferred embodiment, the arresting the flow of foulant is carried out prior to the detection of a loss in surface performance during the subjecting of the surface to the flow of foulant. Surface performance may for instance be the transfer of heat from a fluid on one side of the surface to to fluid on the other side (one of which fluids may be the flow of foulant itself), and can be measured by monitoring the temperature of the involved fluids. Alternatively, surface performance may for instance be the filtering of specific substances in the flow of foulant to yield a filtrate and a retentate, in which case performance can be measured by the composition of said filtrate and/or retentate, or by the flux of said filtrate and/or retentate.

Cleaning, whether elimination or reduction, of the accumulated foulant from the fouled surface can be achieved by any means known in the art. The chosen means will depend on the foulant and surface nature. Exemplary methods are chemical methods, such as dissolving the foulant with e.g. detergents, or burning off the foulant; biological methods, such as enzymatic degradation of the foulant; or mechanical methods such as physical removal, e.g. by scraping or by blasting with a stream of fluid such as water.

The effectiveness of the cleaning method employed can be assessed based on the level of fouling remaining after the cleaning process, said level being determined according to the method of the present invention in any of its embodiments.

In a preferred embodiment of the method for detecting and cleaning a fouled surface of the present invention, in any of the above embodiments, the surface sensitive sensor unit is additionally a sensor suitable for measuring the thickness of the foulant accumulated on the second surface, as described above. Examples of such surface sensitive sensor units are acoustic wave sensors, waveguide sensors or surface plasmon resonance sensors. From the knowledge of deposited foulant mass and thickness, a qualitative idea of the nature of the foulant deposited on the surface is obtained, as different kinds of foulant possess different densities. This permits adopting a cleaning strategy suited to the nature of the accumulated foulant, and in turn saving cleaning agent, diminishing the environmental impact of the cleaning procedure, prolonging membrane lifetime and reducing membrane process dead times.

Thus, either during step i., or before step iii., the method comprises:
  Detecting the mass of the accumulated foulant and detecting the thickness of the accumulated foulant, thereby establishing the density of the accumulated foulant;
  Optionally, comparing the density of the accumulated foulant to known densities of foulants, or preferably to known densities of individual foulants known to be present or suspected to be present in the flow of foulant; and establishing which foulants are present in the accumulated foulant, or the specific amount of each of said individual components in the accumulated foulant based on said densities;
  Choosing a cleaning agent or an amount of cleaning agent based on the density of the accumulated foulant, or, if the comparing was performed, based on the foulants established to be present in the accumulated foulant, or based on their amounts.

The comparing stage allows an approximation to the sort of foulant present in the accumulated foulant. For instance, if foulant type A has a density of 1 kg/m$^3$ and foulant type B has a density of 100 kg/m$^3$, then a sensed density of 50 kg/m$^3$ will indicate both foulant types are present.

Alternatively, the composition of the accumulated foulant at a first surface can be determined by using at least two surface sensitive sensor units, wherein a different deposition material is deposited on each of said surface sensitive sensor units, wherein each deposition material presents a different second surface arranged to contact a flow of foulant, wherein one of said second surfaces provides a stronger accumulation of a first foulant and weaker accumulation of a second foulant, and the other of said second surfaces provides a stronger accumulation of a second foulant and weaker accumulation of a first foulant. Each second surface is subjected to a same flow or sub-flow of foulant, the flows or sub-flows comprising a same unknown amount of the first and second foulant, the flow or sub-flow being the same as that to which the industrial surface is subjected. Based on the strength of the signal generated by each surface sensitive sensor unit, it is established which of the first or second foulant is present or is predominant in the flow of foulant, and a suitable cleaning agent is selected accordingly.

In any of the above method for detecting and cleaning a fouled surface embodiments, the subjecting of the surfaces to the flow of foulant is resumed after step iii.

The methods for detecting and cleaning a fouled surface of the present invention are suitable for cleaning devices comprising a surface subjected to fouling.

In any of the embodiments disclosed herein, the second surface, or the first and second surfaces, of the method of the present invention is an organic surface, and is preferably made of or comprises an organic polymer. Preferably, the organic surface is made of or comprises a polyamide, a polysulfone, a polyvinyldifluoride, cellulose acetate, a polyimide, a polyacrylonitrile, a polydimethylsiloxane, or a polyurethane, or combinations thereof.

In an embodiment, the second surface, or the first and second surfaces, of the method of the present invention is an inorganic surface, preferably a ceramic or metal surface. In a particular embodiment, the second surface, or the first and second surfaces, is a ceramic surface, which preferably comprises or is made of alumina, titania, zirconia, recrystallised silicon carbide or glassy materials. In a particular embodiment, the second surface, or the first and second surfaces, is a metal surface, wherein the surface is made of any conventional metal employed in pipes or reactors such as steel.

Although the present invention is not limited to any particular industrial setting, a number of especially representative industrial applications are described below.

In an embodiment, the present invention (method and device) is used for monitoring fouling of a filtration membrane. Preferably, the filtration membrane is a filtration membrane used for water treatment, such as wastewater treatment e.g. sewage water, or residual water produced in the oil & gas industry; water sterilization such as for sanitary applications; or desalination. In another embodiment, the filtration membrane is a filtration membrane used for the filtration of solvents.

Thus, the second surface, or the first and second surfaces, is a membrane. In the context of the present invention, the term "membrane" or "filtration membrane" refers to a thin layer of semi-permeable material that selectively allows certain species to pass through it while others are retained. Thus, a membrane functions like a filter medium permitting the separation of a component by selectively controlling the passage of the components from one side of the membrane to the other side.

Examples of membranes include hollow fiber membranes, flat-sheet membranes, spiral wound membranes, or tubular membranes. Flat-sheet membranes are formed from one or more sheets of membrane material placed adjacent to or bonded to one another. Spiral wound membranes are flat sheet membranes which are wrapped around a central collection tube. Tubular membranes and hollow fiber membranes assume the form of hollow tubes of circular cross-section, whereby the wall of the tube functions as the membrane.

The filtration membranes may be porous or have no visible pores (commonly denoted "non-porous" or "dense" membranes). Normally, filtration membranes are manufactured from an organic polymer, although other forms, including ceramic and metal membranes, may be available. For example, the filtration membrane may comprise or be made of a material selected from a polyamide, a polysulfone, a polyvinyldifluoride, cellulose acetate, a polyimide, a polyacrylonitrile, a polydimethylsiloxane, or a polyurethane, or combinations thereof. In an embodiment, the membrane comprises or is made of polysulfone. In a preferred embodiment, the membrane comprises or is made of polyamide.

Membrane processes are increasingly used for removal of bacteria, microorganisms, particulates, and natural organic material, which can impart color, tastes, and odors to water and react with disinfectants to form disinfection byproducts. Some examples of membrane processes include microfiltration (MF), ultrafiltration (UF), nanofiltration (NF), and reverse osmosis (RO).

In another embodiment, the present invention (method and device) is used for monitoring fouling of underwater surfaces, more particular marine underwater surfaces such as the bottom of marine vessels exposed to seawater.

In another embodiment, the present invention (method and device) is used for monitoring fouling of surfaces involved in the production of foodstuffs, including beverages, food and fodder, wherein deposition of biological compounds such as proteins is of particular concern.

In another embodiment, the present invention (method and device) is used for monitoring fouling of fluid container surfaces, such as reactors, tanks or piping/tubing, in particular those involved in cooling/heating or heat exchange, for instance in the oil and gas industry, e.g. for the production of fuel such as coke.

In another embodiment, the present invention (method and device) is used for monitoring fouling of surfaces involved in chemical reactions such as polymerization reactions, such as cooling/heating reactors or catalytically active surfaces, e.g. in the production of polyolefins.

The present invention is also directed in another aspect to a device, system, or setup for carrying out the method of the present invention as described in any of the embodiments disclosed herein.

Thus, the device, system or setup comprises:
  a first surface arranged to contact a flow of foulant;
  a sensor system comprising at least one surface sensitive sensor unit, wherein a deposition material is deposited on said surface sensitive sensor unit, wherein the deposition material presents a second surface arranged to contact a flow of foulant;
  wherein the second surface presents at least one physicochemical property of the first surface which at said first surface is responsible for foulant accumulation;
  wherein said surface sensitive sensor unit is suitable for generating signals in response to foulant accumulation of from 1 ng/cm$^2$ to 0.1 mg/cm$^2$ at the second surface;
  wherein the sensor system is connected to a data acquisition and monitoring system suitable for monitoring said signals generated by said surface sensitive sensor unit.

Embodiments and preferences relating to each of the components of the device of the invention are as described above for the method of the invention.

The means for carrying a flow of foulant to the second surface, or first and second surfaces, and thus enabling the subjecting of said surface to the flow of foulant can be any means known to the skilled person which allow for fluid communication of a source of flow of foulant with the surface or surfaces. In the case of the industrial surface, which will typically be of a considerable size, this can be achieved by the use of means such as tubes or pipes. The surface can be independent from said means for carrying the flow of foulant or an integral part thereof, or it can be deposited on an inner surface of said means. In the case of the second surface, the means for carrying the flow of foulant can be channels, such as microchannels, in a microfluidic device (when the sensor-deposition material complex is comprised therein), or tubing such as standard laboratory polytetrafluoroethylene tubing.

Preferably, said means for carrying a flow of foulant to the surface or surfaces are also means for carrying flow of foulant already subjected to the surface or surfaces away from said surface or surfaces.

The means for carrying a flow of foulant to the surface or surfaces preferably comprise an inlet for inputting the flow of foulant into said means. The means for carrying a flow of foulant from the surface or surfaces preferably comprise an outlet for outputting the flow of foulant from said means. Where the surface is independent from said means for carrying a flow of foulant to/from the surface, the surface and/or the means comprise means for connecting these parts such that they remain in fluid communication. For example, the surface may be comprised in a chamber connected on the one hand to the outlet of the means for carrying the flow of foulant to said chamber, and hence to the surface, and on the other hand to the inlet of the means for carrying the flow of foulant away from said chamber, and hence away from the surface. The chamber is preferably a chamber suitable for directing the flow of foulant to and past the surface.

In a preferred embodiment, when the method of the invention is run in parallel or simultaneously, the means for carrying a flow of foulant to the first and second surface comprise means for splitting the flow of foulant into at least two separate sub-flows of foulant and for carrying one of said sub-flows of foulant to the first surface, and the other of said sub-flows of foulant to the second surface. Means for splitting the flow of foulant are well known in the art and comprise T- or Y-junctions.

EXAMPLES

Specific embodiments of the invention which in no case must be considered limiting are presented below.

Example 1: Fouling at an Industrial Surface

Water membrane filtration experiments were conducted using different sets of membranes made of a polyamide that had been modified to different degrees with a chemical functionalization (polyethylene glycol) which would render the polymer increasingly less prone to membrane fouling.

As a model flow of foulant, a model protein solution based on bovine albumin serum (BSA, 100 mg/l) was employed. For this purpose, the BSA was dissolved in a PBS buffer solution. The model flow of foulant was used as a feed solution in a membrane ultrafiltration unit with the membrane molecular cut-off being in this particular case sufficient to warrant a protein retention of more than 97%.

The resulting water fluxes for polyamide membranes with different degrees of antifouling functionalization are depicted in FIG. 3 (filled circles). As antifouling functionalization of the polyamide membrane was increased, the resulting water flux was higher. The degree of the membrane fouling was depicted on the secondary axis (open squares). Particularly, without antifouling functionalization the membrane was fouled and the water flux was strongly affected. At zero antifouling functionalization, the degree of fouling was maximum (herein referred to as "100%") resulting in a flux that is only 75% of the maximum possible. Withdrawing the membranes used from the filtration cell, no visible change of the membrane surface was observed by optical light microscopy whose detection limit is in the range of the wavelength of visible light (400-700 nm).

Example 2: Fouling at a Surface According to the Present Invention

The same polyamide surfaces as employed in Example 1 were deposited by spin-coating on sensors of a quartz crystal microbalance with dissipation monitoring (QCM-D) and a multi-parameter surface plasmon resonance (MP-SPR) equipment. The respective polyamide coated sensors were then contacted with the same model foulant solution as in Example 1.

FIG. 4 illustrates that QCM-D and SPR detected a maximum fouling at 0% of membrane modification of the polyamides and a minimum fouling at highest membrane modification (75%).

The minimum fouling mass detected generated a frequency change of about 3 Hz which according to the Sauerbrey equation corresponds to about 53 ng/cm$^2$ and, hence, an average fouling layer thickness of 0.4 nm, assuming a density of the fouling layer of 1.22 g/cm$^3$ [Acta Crystallogr D Biol Crystallogr. 2000 July; 56(Pt 7):791-4]. The maximum fouling under these experimental conditions—occurring at no modification of the polyamide—yielded a frequency change of about 30 Hz and thus corresponded to about 530 ng/cm$^2$ which in turn amounted to a fouling layer thickness of about 4.4 nm. This layer thickness results in a water filtrate flux that 27% lower than what would be the case without fouling and is two orders of magnitude below what conventional optical techniques that work with visible light would be able to detect. This clearly demonstrates how the method of the invention is highly suitable for the early-stage detection of membrane fouling.

For each degree of membrane functionalization, the respective normalized water flux from FIG. 3 (water filtration experiments) and the respective degree of fouling from FIG. 4 (QCM-D and SPR experiments) were plotted in FIG. 5. As can be seen, the degree of fouling as detected by QCM-D and SPR depicted in FIG. 4 were entirely correlated with the independently conducted membrane filtration experiments (FIG. 3). Hereby, during the water filtration experiments the same membrane polymers were used as those deposited on the sensor surface during QCM-D and SPR measurements. The size of the second surface (i.e. the surface of the deposition material deposited on the sensors) was 25 mm$^2$, whereas the size of the industrial membrane was 120 cm$^2$, i.e. the sensor-membrane complex of the present invention was capable of reproducing, at a 500-fold smaller size, what the fouling behavior at the industrial membrane is. FIG. 5 shows that the sensor system adsorption data correlate very well with the normalized water flux data measured during filtration. This means that the sensor system could faithfully predict the fouling in the membrane filtration process.

Example 3: Exemplary Cleaning Method of the Invention

As in the previous Examples, a polyamide membrane is used for filtration of a model foulant solution comprising 100 mg/l BSA in PBS.

FIG. 6A depicts a maximum water flux during an initial filtration period. After a certain time, the water filtrate flux starts declining, presumably due to fouling by the protein model foulant. In the filtrate, this flux decrease is detected and monitored (FIG. 6B). When the flux decline reaches a certain threshold, here: 20% as indicated by the dashed line (5), the process is arrested and the cleaning procedure initiated (1) (here: dilute NaOH solution and rinsing afterwards with water). After cleaning, the filtration process is resumed (2) and the water filtrate flux is recovered, although only partly (3), as compared to the flux observed without cleaning (4). The fact that the filtrate flux is only partially recovered and not 100% stems from the fact that the cleaning procedure was initiated at a point when a persistent fouling layer had already developed such that the cleaning procedure could not efficiently remove all the foulant. Lowering the threshold would hereby not make a significant difference because filtrate flux decline is not only a very poor indicator for membrane fouling, but it also fluctuates during operation which is why a robust threshold must be chosen. Furthermore, it should be noted that FIG. 6C represents no direct evidence of fouling on the membrane polymer surface: it is assumed that the flux decline is due to membrane fouling but the flux decline could stem from other perturbations in the filtration unit. The cleaning procedure is therefore conducted based on a guess rather than on evidence.

In contrast, FIG. 6B depicts a water filtration under identical operation conditions, but where the invention is used as a monitoring technique in a by-pass configuration and using the same polymer material as a sensing coating as used in the filtration membranes. Again, at an initial stage of the water filtration the filtrate flux is maximum (FIG. 6B). At a certain time of operation, the invention starts detection adsorption of foulants on the polymer surface (FIG. 6D). It should be noted that this increase in sensor signal occurs while the water filtrate flux is still at a constant maximum value. At a certain time, the sensor signal reaches a predefined threshold (in FIG. 6D depicted in arbitrary units, (6)) which indicates that a fouling layer has been developing enough such that it the filtration process should undergo a cleaning procedure. It is pointed out that due to the early stage warning, the cleaning procedure needs to be chemically less aggressive and less time-consuming than in the example depicted in FIGS. 6A and C. It also is stressed that FIG. 6D represents a direct evidence that fouling occurs on the polymer surface in the by-pass configuration, which in turn can be correlated directly with fouling phenomena occurring in the industrial membrane filtration process using the same membrane polymer. This allows adjusting the cleaning strategy. After cleaning, the filtration process is resumed, maintaining a maximum water filtrate flux (FIG. 6B, (3)) because due to the early-stage detection the fouling had developed significantly less than in the previous example and therefore could be removed more efficiently by the cleaning procedure, instead of leading to a build-up of a persistent fouling layer and, hence, water filtrate flux decline (FIG. 6B, (4)).

Example 4: Identification of Deposited Foulant Nature and Optimization of Cleaning Strategy A further important advantage of the concept proposed is the fact that it yields a fingerprint which allows membrane cleaning to be adapted to the type of fouling that occurs on the membrane surface. FIG. 7A illustrates a deposition on the membrane surface that develops with filtration time and that can be, as an example, either organic or inorganic. From this graph alone it can be seen that no information on the type of deposition can be deduced. The sensor system proposed (QCM-D alone or preferably QCM-D and SPR) allows, however, to not only determine the mass deposited, but also the thickness. Therefore, qualitative data on the density of the deposited layer can be obtained. FIG. 7B illustrates how an inorganic and organic layer, respectively, may yield a similar deposited mass but strongly differ in their density: for example, an inorganic layer will deposit ("scaling") with a significant higher density than an organic layer ("fouling"). This follows from the fact that inorganic matter has a density which is almost twice that of organic matter. With the sensor system allowing in this way distinguishing between both, the cleaning strategy can be adapted accordingly: washing the membrane with dilute sodium hydroxide (NaOH) is a common strategy to remove organic matter from the membrane surface but does not at all work with inorganic matter. The latter is removed by washing with dilute acids which do not work for removing organic matter. Because the sensor system can qualitatively distinguish between both types of deposition, the right cleaning agent can be chosen and a wrong cleaning strategy widely been avoided.

An additional way to confirm the physico-chemical nature of the fouling layer is the use of different membrane polymers, or slight modifications of the membrane polymers, which are known to interact to different degrees with components of the fouling layer. For example, FIG. 8 depicts the case of two membrane polymers, Polymer 1, Polymer 2 and Polymer 3, respectively, which possess different functional groups on their surface. A and B are solutes with a different physico-chemical nature and require a different cleaning strategy, such as, for example, indicated in FIG. 7. The polymers are chosen such that Polymer 1 preferably interacts with feed solute A, while Polymer 3 favourably interacts with solute B. Polymer 2 interacts with both A and B.

A strong response of the sensors with Polymer 1 together with a low response of the sensors with Polymer 3 will indicate the predominant presence of solute A in the fouling layer and thus provides, further to the feature outlined in FIG. 7, an additional indication on the cleaning strategy to follow. The opposite applies in the case that the sensor with Polymer 3 provides the strongest signal.

The invention claimed is:

1. A method for detecting surface fouling comprising:
   a) providing a first surface arranged to contact a flow of foulant;
   b) providing a sensor system comprising at least one surface sensitive sensor unit, wherein a deposition material is deposited on said surface sensitive sensor unit, wherein the deposition material presents a second surface arranged to contact a flow of foulant;
      wherein the second surface presents all physico-chemical properties of the first surface which at said first surface are responsible for foulant accumulation;
      wherein said surface sensitive sensor unit is suitable for generating signals in response to foulant accumulation in an amount of from 1 ng/cm$^2$ to 0.1 mg/cm$^2$ at the second surface; and
      wherein the sensor system is connected to a data acquisition and monitoring system suitable for monitoring said signals generated by said surface sensitive sensor unit;
   c) subjecting the second surface to a flow of foulant;
   d) monitoring said signals generated by said surface sensitive sensor unit and detecting an amount of foulant of from 1 ng/cm$^2$ to 0.1 mg/cm$^2$ accumulated at the second surface; and
   e) deeming an amount of foulant accumulated at the first surface to be a reproduction of the amount of foulant accumulated at the second surface detected in step d), should said first surface be subjected to the same flow of foulant to which the second surface is subjected to in step c);
      wherein the first and second surfaces are inorganic surfaces, or wherein the first and second surfaces comprise an organic polymer;
      wherein the first surface is larger than the second surface; and
      wherein the first and second surfaces are independent from each other.

2. The method according to claim 1, wherein in step c) the first surface is subjected to the same flow of foulant to which the second surface is subjected to in step c).

3. The method according to claim 1, wherein in step c) the first and second surface are subjected to a same flow of foulant by splitting a flow of foulant upstream from the first and second surfaces into at least two separate sub-flows of foulant, and subjecting the first surface to one of said sub-flows of foulant, and subjecting the second surface to the other of said sub-flows of foulant.

4. The method according to claim 1, wherein the first surface has a surface area of 10 cm$^2$ or higher and the second surface has a surface area of from 10 nm 2 to 5 cm$^2$.

5. The method according to claim 1, wherein the first surface and the second surface are made of the same material.

6. A device comprising:
   a first surface arranged to contact a flow of foulant;
   a sensor system comprising at least one surface sensitive sensor unit, wherein a deposition material is deposited on said surface sensitive sensor unit, wherein the deposition material presents a second surface arranged to contact a flow of foulant;
   wherein the second surface presents all physico-chemical properties of the first surface which at said first surface are responsible for foulant accumulation;
   wherein said surface sensitive sensor unit is suitable for generating signals in response to foulant accumulation in an amount of from 1 ng/cm$^2$ to 0.1 mg/cm$^2$ at the second surface;
   wherein the sensor system is connected to a data acquisition and monitoring system suitable for monitoring said signals generated by said surface sensitive sensor unit,
   wherein the first and second surfaces are inorganic surfaces, or wherein the first and second surfaces comprise an organic polymer;
   wherein the first surface is larger than the second surface; and
   wherein the first and second surfaces are independent from each other.

7. The device according to claim 6, further comprising:
   a source of flow of foulant;
   means for carrying a flow of foulant from said source of flow of foulant to a means for splitting said flow of foulant into at least two separate sub-flows of foulant;
   means for carrying one of said sub-flows of foulant from the means for splitting said flow of foulant to the first surface; and
   means for carrying the other of said sub-flows of foulant from the means for splitting said flow of foulant to the second surface.

8. The method according to claim 1, wherein the surface sensitive sensor unit is suitable for detecting the thickness of mass of foulant deposited on the surface, wherein the thickness is from 1 nm to 1000 nm.

9. The method according to claim 1, wherein the sensor system comprises at least two surface sensitive sensor units, one of which is a surface sensitive optical sensor unit and the other of which is a surface sensitive acoustic sensor unit.

10. The method according to claim 9, wherein the surface sensitive optical sensor unit is suitable for sensing foulant accumulation without the flow of foulant interfering in the sensing.

11. The method according to claim 9, wherein the surface sensitive optical sensor unit is a multi-parameter surface plasmon resonance (MP-SPR) sensor unit.

12. The method according to claim 9, wherein the surface sensitive acoustic sensor unit is a quartz crystal microbalance with dissipation monitoring (QCM-D).

13. The method for detecting and cleaning a fouled surface, comprising the steps of:

i. detecting surface fouling with a method as defined in claim 1;

ii. arresting the flow of foulant after signals in response to foulant accumulation have been generated by the surface sensitive sensor unit;

iii. then subjecting the second surface, or the first and second surfaces, to a flow of cleaning agent;

the method further comprising monitoring a performance of the first or second surface, wherein steps i to iii take place before a loss in the monitored performance is detected.

14. The method according to claim 13, wherein the first and second surfaces are a filtration membrane, and wherein the surface performance of the first or second surface is monitored by monitoring a flux of filtrate resulting from subjecting of the second surface, or of the second and first surface, to the flow of foulant.

* * * * *